Oct. 21, 1924.  1,512,808
M. B. SETTER
SELF ADJUSTING BEARING
Filed July 1, 1922
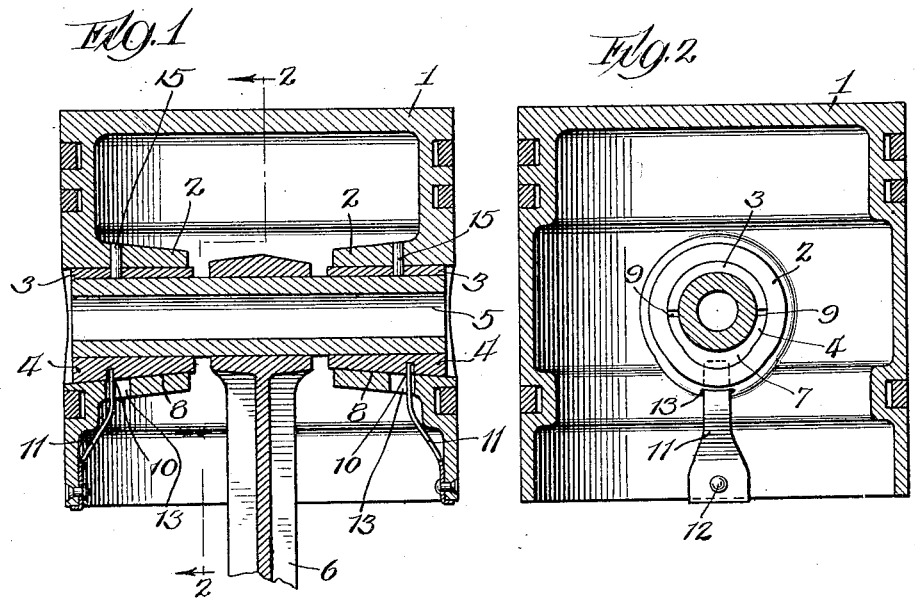
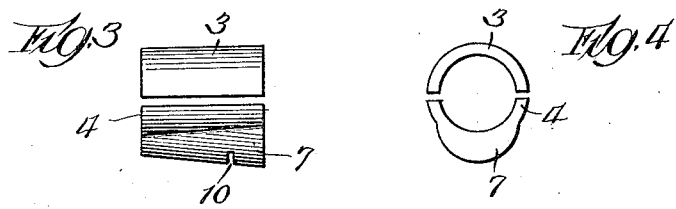
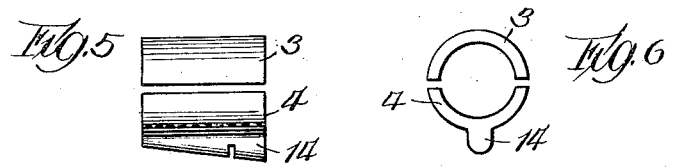
Inventor
Michael B. Setter
by Arthur F. Durand
Atty.

Patented Oct. 21, 1924.

1,512,808

UNITED STATES PATENT OFFICE.

MICHAEL B. SETTER, OF CHICAGO, ILLINOIS, ASSIGNOR OF ONE-HALF TO ALEXANDER W. HILKER, OF CHICAGO, ILLINOIS.

SELF-ADJUSTING BEARING.

Application filed July 1, 1922. Serial No. 572,183.

*To all whom it may concern:*

Be it known that I, MICHAEL B. SETTER, a citizen of the United States, and resident of Chicago, Cook County, Illinois, have invented a certain new and useful Improvement in Self-Adjusting Bearings, of which the following is a specification.

This invention relates to self adjusting bearings of that kind in which means are provided for automatically taking up wear to prevent lost motion. Bearings of this kind are employed, for example, in the pistons of internal combustion engines, for the wrist pin of the pitman, and in other situations.

Generally stated, the object of the invention is to provide an improved construction and arrangement whereby a bearing of this kind, involving a movable element to take up wear, is provided with means for preventing said element, or elements, if more than one, from turning or oscillating with the wrist pin or other oscillatory or rotary member to which the bearing is applied, but permitting the necessary adjustment of said element or elements, from time to time, automatically, of course, while the piston is in motion, in order to take up wear to prevent lost motion between the piston and the pitman which connects the piston to the crank shaft of the engine, as will hereinafter more fully appear.

To these and other useful ends the invention consists in matters hereinafter set forth and claimed and shown in the accompanying drawings in which—

Figure 1 is a vertical section of an internal combustion engine piston having wrist pin bearings therefor provided with automatic adjusting means embodying the principles of the invention.

Figure 2 is a vertical section on line 2—2 in Figure 1.

Figure 3 is a side elevation of the wearing elements of one of said bearings.

Figure 4 is an end elevation of the elements shown in Figure 3.

Figure 5 is a view similar to Figure 3, showing a different form of the invention.

Figure 6 is an end elevation of the elements shown in Figure 5.

As thus illustrated, the invention comprises a piston 1 of any suitable known or approved character, such as those ordinarily employed in internal combustion engines. Internally said piston is provided with a pair of oppositely arranged bosses 2, and the upper and lower wearing elements 3 and 4 are arranged loosely in said bosses to support the hollow wrist pin 5 therein. The pitman 6, it will be understood, is rigid with said wrist pin, so that the latter must turn or oscillate in said bearings. Each lower element 4 is provided on its under side with an integral cam portion 7, to engage the lower inclined surface 8 formed internally of each boss, whereby inward movement of the elements 4 toward the pitman 6 will cause a tightening of the bearings. The upper elements 3 are each approximately one-half of a cylinder, in form and shape, and the lower elements 4 would be of the same character were they not provided with the cams 7 which cause the tightening action. Slight space 9 is, therefore, provided between the edges of the elements 3 and 4, thus permitting the taking up of wear in the manner specified. In order that the wear may be automatically taken up, while the piston is in motion, each cam portion 7 is provided on its lower side with a recess 10 to receive the upper end of a spring 11, which latter has its lower end portion secured by a rivet 12 to the lower side wall of the piston.

With the foregoing construction, the automatic tightening action is as follows: When the parts are all first assembled the wrist pin 5 fits snugly in the wearing elements 3 and 4, and the springs 11 are at the outer ends of the holes 13 formed in the lower walls of the bosses 2, thus affording freedom of movement of said springs toward each other. Of course, most of the wear is on the elements 3, by reason of the fact that this is the thrust side of the bearings, taking into account that the thrust is on this side of the bearing when the explosion occurs in the engine, and also while the piston is compressing a fresh charge. In fact there is very little pressure or load imposed on the elements 4, inasmuch as practically all of the work is done by the upper side of each bearing, in an internal combustion engine of this kind. Therefore, of course, the elements 3 will wear and become thinner, and then the springs 11, which are tensioned for this purpose, will gradually move the elements 4 toward each other, and the cams 7 will force these elements upward, thus keeping the upper side of the wrist pin 5 tightly pressed against the upper side of each bearing, inasmuch as each element 3 will be maintained tightly against the upper wall of each boss 2 in which said bearings are provided. Now, during the operation of the engine, and while the automatic tightening action of the bearings is taking place, it will be seen that the oscillation of the wrist pin 5 will tend to twist or turn the elements 3 and 4, and while the upper elements 3 are held against this rocking or oscillating motion, the lower elements 4 are prevented by the cams 7 from doing this. The cams 7, in other words, prevent any oscillation of the elements 4 while the wrist pin 5 is rocking back and forth or turning in the bearings. In this way, therefore, the elements 4 cannot be disengaged from the springs 11, and in addition the spaces 9 cannot travel around until they are perhaps at the top and bottom of the bearing, instead of at each side thereof as they should be. Each bearing, in other words, is a split bearing, and the construction is such that the plane of separation between the two halves of each bearing is always practically horizontal. When the upper elements 3 become badly worn they can be taken out and replaced by new ones. The same is true of the lower elements 4, but the latter, of course, will not wear as fast and will not have to be renewed as often.

In Figures 5 and 6 the construction is similar to that shown in Figures 3 and 4, except that in this case the cam 14 is narrower, and with such formation the lower side of the boss, 2 at each side of the piston, will have a relatively narrow groove for each cam 14, instead of the comparatively wide groove necessitated by the wide cams 7 previously described. In either case, however, the lower elements 4, or lower section 4 of each bushing with which the bearing is provided, is prevented from turning with the wrist pin 5, and hence the gaps or spaces 9, as previously described, will always remain at each side of the wrist pin, in a horizontal plane, and cannot travel around or be displaced. Thus, in a structure as shown and described, each bearing has an upper or non-thrust side, and has a lower or thrust side, and the automatic tightening or wear take up means are applied to the non-thrust side of each bearing. With the upper section 3 of each bearing forming practically one-half of a cylinder, and with the lower section 4 formed in the same manner, except for the cam 7, it will be seen that the piston can be bored transversely to receive the bearings, and the bore of each boss 2 can then be formed with an inclined partial bore in the lower side of each bearing to receive the cam 7. In other words, a boring tool is first used to bore transversely in the piston, and then a tool of smaller diameter is used at an angle to form the wide and tapered grooves in which the cams 7 are situated, thus facilitating the work of making the piston and the two bearings thereof. Of course, the sections 3 can be secured in place in any suitable or desired manner, but this is preferably done by means of pins 15 inserted through the tops of the bosses 2 and through the upper wall of each shell or section 3, as shown. In a piston construction as shown, this is preferably accomplished by first placing the sections 3 in position within the bosses 2, after the holes are drilled for said pins, and by then inserting these pins through the openings 13 across the transverse bore and into said holes. In renewing the sections 3, the wrist pin 5 is removed, and the sections 4 are removed, and a tool is inserted through the openings 13 and across the bore to push out the pins 15, so that the sections 3 will be released. In any event, though, as previously described, the cams 7 and 14 prevent rocking of the sections 4, and hence the gaps or spaces 9 will always be in a horizontal plane, inasmuch as one gap cannot become wider and the other gap narrower, as would occur if section 4 could rock or oscillate with the wrist pin, and hence the upper edges of each section 4 always remain in a horizontal plane, or in the plane of separation between the two sections of the split bearing thus formed. It will be seen, therefore, that the oscillatory wrist pin 5 has a split bearing at each side of the piston, and that each split bearing comprises a removable adjustable section 3, which can be replaced when worn by use, and a lower adjustable section 4 which is necessarily movable lengthwise of the wrist pin to tighten the bearing and take up wear, inasmuch as the cam 7, or the cam 14, is integral with this lower and axially adjustable non-thrust side of each bearing. Thus each section 4 is held by the spring 11 against outward displacement against the side of the cylinder, but is subject to inward displacement by this spring, thereby to take up wear and keep the bearing tight.

What I claim as my invention is—

1. In an internal combustion engine piston, the combination of split bearings therefor, a transverse member working in said bearings, each bearing having a thrust side and a non-thrust side, substantially as described, tightening means enclosed within the piston for axial displacement against said member at the non-thrust side only of said bearings, adapted to take up wear therein, and automatic means to control said tightening means while the piston is in motion, said tightening means being integral with and serving to prevent the axially movable bearing elements which engage said transverse member from turning or oscillating therewith, whereby one-half of each bearing is held against axial displacement in one direction, by said automatic means, but is subject to such displacement in the other direction to take up wear.

2. A structure as specified in claim 1, said tightening means and said automatic means being carried by and contained within the interior of the piston, in position to move inwardly toward each other from opposite sides of the piston.

3. A structure as specified in claim 1, the thrust side of each bearing comprising a removable section held in place by a pin, with an opening in the lower side of each bearing for the insertion and removal of said pin.

4. A structure as specified in claim 1, the upper or thrust side of each bearing comprising a wearing section, and means to removably hold the wearing section in place, whereby only the lower movable elements are held by said tightening means against oscillation with said member.

5. In a split bearing for a member which turns therein under conditions which impose the load and the thrust on one side only of the bearing, so that the other or non-thrust side is subject to less wear, tightening means applied only to said other or non-thrust side, and automatic means to control said tightening means, whereby to automatically take up wear in the bearing, the thrust side of the bearing being formed by a removable and substantially half section of a cylinder, whereby this side of the bearing can be renewed when worn, and the non-thrust side being formed by a similar section of a cylinder engaging said member and having an integral cam on the under side thereof, which cam serves to keep its section from turning or rotating with said member, so that the plane of division between the two sections remains horizontal, as shown and described.

6. In an internal combustion engine piston, the combination of split bearings therefor, a transverse member working in said bearings, each bearing having a thrust side and a non-thrust side, substantially as described, tightening means enclosed within the piston for the non-thrust side only of said bearings, adapted to take up wear therein, and automatic means to control said tightening means while the piston is in motion, the thrust side being formed by a removable and substantially half section of a cylinder, whereby this side of the bearing can be renewed when worn, and the non-thrust side being formed by a similar section engaging said member and having an integral cam on the under side thereof, to form said tightening means, whereby the plane of division between the two sections of each bearing is prevented by a cam of each bearing from turning or rotating with said transverse member.

7. In an internal combustion engine piston, the combination of bearings therefor, a transverse member working in said bearings, each bearing having a thrust side and a non-thrust side, substantially as described, tightening means enclosed within the piston for the non-thrust side only of said bearings adapted to take up wear therein, and automatic means to control said tightening means while the piston is in motion, each bearing being formed by a removable curved wearing section for the thrust side of the bearing, and by a similar section to engage said member at the non-thrust side, with a cam for each non-thrust side, the two cams being rounded on their under sides and forming said tightening means, whereby the piston may have a straight cylindrical bore for each bearing, with an offset inclined partial bore for the under side of each bearing to receive said cams.

MICHAEL B. SETTER.